United States Patent [19]

Frost et al.

[11] Patent Number: 5,702,839
[45] Date of Patent: Dec. 30, 1997

[54] MANUFACTURE OF ELECTRODES

[75] Inventors: Jonathan C. Frost, Peppard Common; John M. Gascoyne, Bledlow Ridge; Graham A. Hards, Wallingford, all of United Kingdom; David P. Wilkinson; Keith B. Prater, both of Vancouver, Canada

[73] Assignee: Johnson Matthey Public Limited Company, London, United Kingdom

[21] Appl. No.: 666,056

[22] Filed: Jun. 19, 1996

Related U.S. Application Data

[63] Continuation of Ser. No. 340,418, Nov. 15, 1994, abandoned.

[30] Foreign Application Priority Data

Nov. 23, 1993 [GB] United Kingdom ............... 9324101

[51] Int. Cl.⁶ ............................................. H01M 4/88
[52] U.S. Cl. ........................ 429/42; 427/115; 502/101
[58] Field of Search ........................... 502/101; 427/115; 429/42

[56] References Cited

U.S. PATENT DOCUMENTS

| | | |
|---|---|---|
| 3,423,247 | 1/1969 | Darland, Jr. et al. |
| 3,979,227 | 9/1976 | Katz et al. .................... 427/115 |
| 4,091,176 | 5/1978 | Alfenaar ........................ 429/40 |
| 4,185,131 | 1/1980 | Goller et al. ................. 427/113 |
| 4,215,183 | 7/1980 | MacLeod ..................... 429/42 X |
| 4,229,490 | 10/1980 | Frank et al. |
| 4,313,972 | 2/1982 | Goller et al. ................. 427/113 |
| 4,585,711 | 4/1986 | Vaidyanathan ............... 429/42 |
| 4,808,493 | 2/1989 | Breault . |
| 4,851,377 | 7/1989 | Breault ........................ 502/101 |
| 4,876,115 | 10/1989 | Raistrick .................... 427/115 |
| 4,910,099 | 3/1990 | Gottesfeld ................... 429/13 |
| 5,053,375 | 10/1991 | Rao ............................ 502/101 |
| 5,068,161 | 11/1991 | Keck et al. .................. 429/44 |
| 5,344,668 | 9/1994 | Rempe et al. ................ 427/115 |

FOREIGN PATENT DOCUMENTS

| | | |
|---|---|---|
| 0026979 | 4/1981 | European Pat. Off. . |
| 0100548 | 2/1984 | European Pat. Off. . |
| 0110491 | 6/1984 | European Pat. Off. . |
| 57-191963A | 11/1982 | Japan . |
| 3-245463 | 1/1992 | Japan . |
| 5-190184A | 7/1993 | Japan . |
| 51-90184 | 11/1993 | Japan . |
| 1361985 | 7/1974 | United Kingdom . |
| 1392353 | 4/1975 | United Kingdom . |
| WO9215121 | 9/1992 | WIPO . |

OTHER PUBLICATIONS

EPO Office Action for EPO Patent Application Serial No. 94308416.0 (Nov. 16, 1995).

*Primary Examiner*—Stephen Kalafut
*Attorney, Agent, or Firm*—Watson Cole Stevens Davis, P.L.L.C.

[57] ABSTRACT

An electrode suitable for use in fuel cells, for example in solid polymer fuel cells, comprises a non-uniform electrode layer and has improved electrochemical performance.

21 Claims, 3 Drawing Sheets

MANUFACTURE OF ELECTRODES

This application is a continuation of application Ser. No. 08/340,418, filed Nov. 15, 1994 (now abandoned).

This invention concerns improved electrodes and method of manufacture of electrodes, and in particular a gas diffusion electrode with an improved performance and a method of manufacture of such electrodes for use in fuel cells.

It is useful to recall that in a fuel cell, a fuel, which may be hydrogen, a hydrocarbon or an oxygen-containing fuel such as methanol, is oxidised at a fuel electrode (anode) and oxygen is reduced at the cathode. An electrolyte contacts the electrodes and may be alkaline or acidic, liquid or solid. The liquid electrolyte phosphoric acid fuel cell (PAFC) operating at a temperature of 190° C.–210° C., is the type of fuel cell closest to commercialization and will find applications in the multi-megawatt utility power generation market and also as combined heat and power, i.e. co-generation systems, in the 50 to several hundred kilowatt range. Fuel cells in which the electrolyte is a solid polymer are known as solid polymer fuel cells, (SPFCs), or proton exchange membrane fuel cells, (PEMFCs). The solid proton-conducting polymer membrane electrolytes, commonly based on perfluorosulphonic acid materials, have to be maintained in a hydrated form during operation in order to prevent loss of ionic conduction through the electrolyte. This limits the operating temperature of the SPFC typically to between 80° C. and 120° C. dependent on the operating pressure. The SPFC does, however, provide much higher power density output than the PAFC, and can operate efficiently at much lower temperatures. Because of this it is envisaged that the SPFC will find use in applications such as small scale residential power generation and in vehicular power generation. In particular, zero emissions regulations have been passed in areas of the United States which are likely to restrict the use of combustion engines in the future. Prototype SPFC-powered vehicles are now being demonstrated for these applications.

In these fuel cells, both the anode reaction, at which the fuel is oxidised, and the cathode reaction, at which oxygen is reduced, require electrocatalysts in order to proceed at useful rates. Precious metals, and in particular platinum, have been found to be the most efficient and stable electrocatalysts for all low temperature fuel cells, operating at below 300° C., in which the electrolyte may be acidic or alkaline in nature, but are particularly useful in acid electrolyte fuel cells such as the SPFC. The platinum electrocatalyst is provided as very small particles (20–50 Å), of high surface area, which are often, but not always, distributed on, and supported by, larger microscopic conducting carbon particles to provide a desired catalytic loading. Electrodes are formed from the electrocatalyst material and, for the fuel cell reactions to proceed efficiently, these electrodes are designed to optimise contact between the reactant gas, the electrolyte, and the precious metal electrocatalyst. The electrode has to be porous, and is often known as a gas diffusion (or gas porous) electrode, in order to allow the reactant gas to enter the electrode from the back, the electrolyte to penetrate through the front, and products, particularly water, to diffuse out of the electrode. Efficient porous gas diffusion electrodes, using platinum loadings of 0.2–0.5 mg/cm$^2$ of electrode area, have been developed for fuel cells using liquid acid electrolytes such as the PAFC. The electrolyte can penetrate the portion of the porous structure of the catalysed carbon support which contains most of the platinum electrocatalyst, and in practice above 90% of the electrocatalyst is effectively utilised to carry out the fuel reactions.

In practice gas diffusion electrodes comprise the electrocatalyst material and other non-catalytic components, such as polymeric binders, formed as one or more layers, and supported on a porous conducting substrate material, for example, conducting carbon materials (papers, cloths, foams) or, particularly in the case of non-acid fuel cells, metal meshes of nickel or steel grids.

In the SPFC the electrodes are bonded to the solid polymer electrolyte, which is in the form of a thin membrane, to form a single integral unit, known as the membrane electrode assembly (MEA). It has been found that the supported catalysed porous gas diffusion electrodes, developed for the PAFC, are in general, unsuitable for use with SPFCs, as only very low current densities are usually attainable. This is because very little of the platinum electrocatalyst surface is present at the three-phase interface, i.e. where the membrane electrolyte is in direct contact with the electrocatalyst surface and an adjacent gas pore. This occurs most readily at the front surface of the electrode where bonding to the membrane occurs. Very little of the depth of the electrode is used as the electrolyte does not penetrate into the depth of the electrode. State of the art solid polymer fuel cells therefore utilise electrodes containing unsupported platinum black with relatively high noble metal loadings, typically 4 mg/cm$^2$ per electrode, in order to maximise the level of platinum contact at the front face of the electrode. Despite the low platinum utilisation, the performance of the state of the an SPFCs is high compared to the PAFC. Current densities of 500 mA/cm$^2$ at 0.72 V, with H$_2$/air as reactants, at a temperature of 80° C. and a pressure of 5 atm, have been reported. However, the platinum requirement of these state of the art electrodes is close to 20 g/kW. For reasons of cost it is widely accepted that the platinum requirement needs to be reduced to levels of around 0.5 g/kW and below for the SPFC to become a viable system for widespread transportation applications. Furthermore, the operating current density needs to be increased to over 1 A/cm$^2$, whilst maintaining cell voltage at around 0.7 V, in order to increase the power density output of the stacks (i.e. reduce the volume taken up by the stack for a given power output).

Significant increases in the effective surface area of the electrocatalyst utilised in these electrodes is required to reduce costs and improve performance. There have, therefore, recently been disclosed a number of methods in which the proton-conducting electrolyte is incorporated into the electrode structure in order to increase the extent of the three-phase interface. For example, U.S. Pat. No. 4,876,115 (United States Department of Energy) discloses an SPFC having electrodes which are modified carbon supported catalysed porous gas diffusion electrodes, formed by applying a solution of a soluble form of a proton-conducting material over the front face of a porous gas diffusion electrode. The preferred electrolyte material is a perfluorocarbon copolymer marketed by E I du Pont, under the trade mark Nafion. WO 92/15121 (United States Department of Energy) also discloses an SPFC electrode in which very thin electrode layers are formed from inks comprising the carbon-supported platinum electrocatalyst and solubilised Nafion. The effective platinum surface at the interface is increased, and it is possible to achieve similar performances to the unsupported state of the art platinum black electrodes, at platinum loadings less than 0.5 mg/cm$^2$.

Even though the platinum utilisation is increased, it is still necessary to develop higher performance, lower cost electrode structures in which the electrocatalyst material is used as efficiently as possible, and in which the rates of reactant gas supply and product removal are sufficiently high to enable practically useful densities, and hence cell power densities, to be attained.

Gas diffusion electrodes are also used in a wide variety of other electrochemical cells in addition to hydrogen-oxygen (air) fuel cells. Other applications include metal-air batteries, metal oxide-hydrogen batteries, chlor-alkali cathodes, ozone generation cathodes and selective gas sensor devices. The materials used in the formation of such electrodes generally comprise the active electrocatalytic metal (or a combination of more than one metal), in the form of either finely divided metal (or oxide) or dispersed and supported on a suitable electrically conducting support, such as particulate carbon, often in combination with various other electrically conducting carbons and polymers, particularly fluoropolymers such as polytetrafluoroethylene. The active electrocatalytic layer is usually applied, and securely bonded, to a rigid electrically conducting substrate such as carbon fibre paper, carbon cloth or metal mesh.

In order to fabricate gas diffusion electrode layers a wide range of processes have been utilised. There are many examples in the prior art of processes which have been employed to produce gas diffusion electrodes, including filtration, powder vacuum deposition, spray deposition, electrodeposition, casting, extrusion, rolling and printing. It is important to note that the technology of these electrode manufacturing processes has primarily been concerned with the formation of one or more uniform layers of the active electrocatalyst component, in terms of either the homogeneity of the formulation of the active layer components and/or the layer thickness.

For example, in U.S. Pat. No. 4,313,972 (United Technologies Corporation), a process for making a gas diffusion electrode is described in which a dry powder comprising carbon and a hydrophobic polymer is applied as a uniform layer on the surface of the substrate by dispersing the powder as a cloud of particles in a chamber over the substrate and pulling the powder onto the substrate by applying a vacuum.

In EP 0 026 979 (Asahi Glass Company Ltd) it has been proposed to use a printing process (screen printing) to form the electrode layer by screen printing a paste comprising an electrode powder on the surface of a cation exchange membrane using a screen of mesh number 10 to 2400 and a thickness of 4 µm to 2 mm. The electrode layer is then calendered (bonded) onto the membrane. The electrode layer being of uniform thickness is formed on one or both of the surfaces of the cation exchange membrane. The paste comprises the electrode powder for example platinum and a hydrophobic polymer for example polytetrafluoroethylene (PTFE). It is prepared according to U.S. Pat. No. 4,585,711 by dispersing the platinum on carbon catalyst and embedding it in PTFE strands by a blending process.

In U.S. Pat. No. 3,423,247 (Union Carbide Corporation) is disclosed an electrode comprising a porous conductive body having at least two zones. The first zone extends inwardly from the electrolyte side of the electrode, which is highly permeable to the liquid electrolyte and extremely active electrochemically; and a second zone, adjacent the first zone, which is gas-permeable and highly repellant to the liquid electrolyte. Each zone is made up from a plurality of layers each of which is itself uniform in composition and thickness across the whole of the electrode face so as to provide gradients of electrolyte repellency and electrochemical activity between the two surfaces. A preferred method for manufacture of the electrodes is thermoplastic bonding.

The disclosure in U.S. Pat. No. 4,091,176 (Stamicarbon, BV) describes a porous multilayer electrode with the layers being formed by bonding together the required number of layers.

In U.S. Pat. No. 4,185,131 (United Technology Corporation) is disclosed an electrochemical cell electrode which is manufactured by screen printing an electroconducting material onto a porous substrate and finally catalysing the electroconducting layer. A series of layers of electroconducting material can be built up with the final step being catalysing the outermost layer. It is stated in this disclosure that one drawback of this method is that it is not suitable for use with pre-catalysed carbon.

European patent application EP 0 100 548 (Asahi Glass Company Ltd) discloses a method of manufacture of a gas diffusion electrode in which a modified carbon black powder (partially graphitised) is uniformly incorporated into a three-dimensional net-work structure of PTFE.

In U.S. Pat. No. 4,585,711 (Communications Satellite) is disclosed a method of manufacturing a gas diffusion electrode in which the catalytic electrode layer is bonded to one side of a conductive grid and to the other side of the grid is bonded a semi-permeable layer of PTFE. The electrocatalytic layer is dispersed in a matrix of filamentary PTFE.

In WO 92/15121 (United States Department of Energy) very thin active catalyst layers comprising a composite film are formed by dispersing supported platinum electrocatalyst, at platinum loadings of less than 0.35 mg/cm$^2$, in a film of proton conducting material. The film is applied to a solid polymer electrolyte membrane by transfer from a teflon release blank under temperature and pressure. The active layer is uniformly thin, and contains a uniform dispersion of the supported electrocatalyst layer in the proton conducting binder layer.

Ideally the electrolyte should penetrate into the electrode sufficiently to reach the interior surfaces of the electrode and thereby contact the reactant gases in the presence of the electrocatalyst in as many places as possible. On the other hand, the electrode must be sufficiently hydrophobic in chatacter to prevent the electrolyte or water from totally filling the pores of the electrodes, which can cause flooding of the electrode. When flooding occurs, it becomes more difficult for the reactant gases to diffuse through to the catalyst sites and also more difficult for the product of the fuel cell reaction to diffuse out of the electrode structure and the cell performance drops.

The disclosure in EP 0110491 (Westinghouse Electric Corporation) seeks to overcome this problem of flooding by preparing an electrode in which catalyst is dispersed equally through the plane of the electrode which is parallel with the substrate. This is achieved by depositing layers onto a substrate in which each layer contains different proportions of catalyst and hydrophobic and hydrophilic agglomerates. This layered structure assists in maintaining a correct balance between electrode pores which are electrolyte-repellant and allow gas flow, and those which are wettable to the electrolyte and fill with electrolyte material.

The technology of electrode manufacture has primarily been concerned with the composition of the electrocatalyst layer and the processes used to produce a uniform layer of the catalytically active material which in turn could be securely and conductively bonded onto a chosen substrate. There are many examples of patents which have been directed to producing improved electrodes to achieve particular structural and operational requirements.

In GB 1,392,353 (Zlehit) it is disclosed that an electrode with an improved efficiency results from a process whereby a metal grid supports both a catalytic-layer and a gas-permeable layer such that the layers interpenetrate with each other at the interface. This provides a gradient of electrocatalyst which decreases in concentration in a direction away from the substrate.

The disclosure in GB 1,361,985 describes a method for preparing an electrode in which a first fibrous layer containing catalyst is deposited on a substrate and a second layer of material (a coating) is deposited on top of the first layer. The advantage of this electrode structure is that the catalyst powder is retained on the substrate. Catalyst from the first layer intermixes to a limited extent with the second layer such that there is a decrease in concentration of catalyst in a direction away from and perpendicular to the substrate.

The teaching in U.S. Pat. No. 4,185,131 is directed to producing electrodes of uniform quality and of a single layer by using the technique of screen printing. The electrocatalyst is present in a concentration which is equal in all directions with respect to the substrate.

In U.S. Pat. No. 3,979,227 (Katz et al) an electrode structure is disclosed in which a post-catalysation stage achieves deposition of almost all of the catalyst onto a single hydrophilic region with minimal deposition in a single hydrophobic material. The concentration of the electrocatalyst decreases moving in a direction perpendicular to the substrate. The advantage of this deposition is stated to be that there is an improved utilisation of electrocatalyst because deposition occurs at points where electrolyte will contact the hydrophilic region.

In each unit cell of a practical fuel cell stack the reactant gases are introduced into the back of the electrode through a manifold and then pass down the back face of the electrode via a single or a multiplicity of channels which are formed either in the back of the electrode-supporting substrate or in a separate gas flow channel plate in close contact with the back of the electrode. As gas passes along the channels its composition will change as the reactant is consumed and the products formed.

For example, in the cathode of acid electrolyte fuel cell, where oxygen is reduced, the oxygen concentration will decrease, the relative humidity increase, and the temperature increase as the reactant gas passes along the gas flow channel from the entrance of the cell to the exit from the cell.

Similarly, in the anode gas flow channel, changes in gas composition and temperature will occur as the hydrogen fuel in the presence of water vapour is consumed. The situation may also be further complicated in the anode if the hydrogen fuel, rather than being supplied as pure hydrogen, is provided from a hydrocarbon fossil fuel (such as methanol or methane) which has been separately converted into hydrogen using well established chemical processes, such as steam reforming or partial oxidation. In this case the hydrogen fuel will contain substantial levels of carbon dioxide (up to 25% by volume if the methanol has been steam reformed with water to produce the hydrogen) and trace levels of carbon monoxide (from 1 ppm up to 2%). Changes in the concentration of these gases will occur both as the hydrogen is consumed, and also due to the presence of non-electrochemical gas phase reactions which are known to occur on the catalyst surfaces of the electrode material, at fuel cell operating temperatures. Of particular concern is the presence and further formation of carbon monoxide which acts as a platinum catalyst poison by strongly bonding to the catalyst surface and inhibiting the desired hydrogen oxidation reaction.

As is exemplified in the prior art reviewed above, it is important to appreciate that with all current electrode fabrication processes, uniform layers of the electrode component materials, in terms of active electrocatalyst loading and composition of the electrode constituents, are formed in the direction corresponding to the plane of the electrode substrate. At any point along the gas flow channel the composition of the electrode which is exposed to the reactant gases is essentially constant. It is thus apparent that due to the presence of reactant gas composition and temperature gradients, each cell provides an averaged performance which is substantially lower than could be achieved. One reason for this is that in some areas across the face of the electrode, the active electrocatalyst can be operating at less than full utilisation, i.e. low efficiency, and in other areas there is insufficient active material for the catalytic functions to be performed to their maximum capability. It is therefore not advantageous to form gas diffusion electrodes with uniform layers in the plane of the face of the electrode when reactant gas composition or temperature gradients exist.

U.S. Pat. No. 4,851,377 (International Fuel Cells Corporation) has attempted to address this problem by forming an electrode with a non-uniform electrocatalyst loading. The non-uniformity is taught as increasing the concentration of the electrocatalyst layer along one axis of the electrode, the axis being parallel to the electrode substrate. The stated advantage of this non-uniformity is that a progressive increase in electrocatalyst loading is required corresponding with the direction along the gas flow channel from the inlet to the outlet so that a uniform current distribution is achieved across the surface of the electrode.

The aim of this invention is to address these problems at the manufacturing stage of the electrode. This will allow matching of the electrode active layer formulation and structure, to the gas flow/water transport/utilisation requirements of the specific cell design. In particular, the use of screen printing allows the pre-determined and controlled application of one or more electrode layers which can be tailored to match gas flow patterns and gradients. Further refinements can be achieved by varying the print pattern across the cell and by using multiple layers to control both the depth and structure of the layers within the pattern. Thus this invention provides a method of varying the electrochemical activity characteristics across the plane of the electrode surface to accommodate variations in gas concentration and flow, water flux and temperature variation.

The advantages of the present invention are to provide a higher performance, lower cost gas diffusion electrode material, for application in fuel cells, in which the composition and structure of the electrode material, is specifically tailored to match the operational requirements of the cell and thereby both maximize the electrochemical performance attainable from the cell, and maximise the efficient use of the precious metal-based electrocatalyst and other components.

The present invention provides a gas-liquid permeable porous electrode comprising a non-uniform electrode layer supported on at least one side of a substrate, wherein the non-uniform electrode layer comprises a first region adapted to be adjacent a bulk gas inlet and wherein said first region has a first amount per unit area of at least one component and a second region, at a point on the substrate remote from the first region, said second region having a second amount of the component said second amount per unit area being different from the first and provided that when the component is an electrocatalyst the amount of the component is not increased between the gas inlet and a gas outlet. The substrate can be either an electron conducting material or a proton conducting solid polymer membrane film.

The non-uniform layer may comprise one or more of a polymeric material, a gas phase active catalyst, carbon particles/fibres or a contact resistance adhesive. Thus the component whose amount varies in the non-uniform layers chosen to promote enhanced electrochemical performance. Suitably the polymeric material is selected from polytetrafluorethylene, polyethylene, polyvinylchloride or a soluble form of a proton-conducting polymer membrane electrolyte and combinations thereof.

Preferably the non-uniform layer comprises an electrocatalyst which may be selected from a metal, a metal oxide, a supported metal or a supported metal oxide. Suitably the electrocatalyst is selected from a platinum group metal, gold or silver or alloys thereof.

The amount of electrocatalyst in the non-uniform electrode layer may be in the range 0.01–10 mg/cm$^2$ of geometric area of the electrode. The amount which is present is dependent on the use of the electrode.

Preferably the non-uniform layer comprises a gas phase active catalyst. The presence of this catalyst has been found to improve the performance with certain compositions of the anode or cathode reactive gas.

The non-uniform layer may be applied to at least one face of the substrate and this substrate can be an electron conducting material or a proton conducting solid polymer membrane film. Similarly the layer can be applied to one face of the substrate or applied to more than one face of the substrate, for example a gas face and electrolyte face. The electrocatalyst layers can also be directly applied to one or more surfaces of a proton-conducting solid polymer membrane, for example as would be used in a solid polymer fuel cell.

Suitably the amount of electrocatalyst decreases between the gas inlet and gas outlet; alternatively the non-uniform electrode layer is in the form of a pattern, e.g. a pattern which coincides with a pathway of gas field flow.

The electrode may form either an anode or a cathode in a fuel cell. A membrane electrode assembly preferably wherein at least one of said electrodes is according to the invention. Suitably the electrode assembly forms a fuel cell comprising at least one electrode manufactured in accordance with the invention.

The invention also provides a process for the production of an electrode comprising the steps:

i) preparation of components and a solvent into paste; and
ii) transferring the paste onto one or more sides of a substrate to form a non-uniform electrode layer, wherein the electrode layer comprises a first region adapted to be adjacent a bulk gas inlet and wherein said first region has a first amount per unit area of at least one component and a second region, at a point on the substrate remote from the first region, said second region having a second amount of the component said second amount per unit area being different from the first and provided that when the component is an electrocatalyst the amount of the component is not increased between the gas inlet and a gas outlet.

Preferably the non-uniform electrode layer is in the form of a pattern and suitably the non-uniform layer is formed by using a screen printing technique. The advantage of this technique is that it is particularly simple to fabricate the non-uniform electrode layer and possibly is the most appropriate technique to prepare the layer coincident with a gas field flow or some other desirable geometry. Where required multiple electrode layers can be built up using this technique.

The invention will be described by way of the following Examples which are to be regarded as illustrative and not limiting.

The following Figures are illustrative of the three embodiments described herein.

The term "performance" is a measure of the cell voltage obtained at a particular current density in a complete single cell operating under defined conditions. A single cell unit comprises an anode, a cathode and an electrolyte, together commonly referred to as a membrane electrode assembly (MEA), in the case of the PEM fuel cell; there are also conducting current collector plates into which gas flow channels are formed into one surface to provide access for reactant hydrogen and oxygen gases to reach the anode and cathode respectively. It is usual for the face of the electrode comprising the electrocatalyst containing electrode layer to be in contact with the surface of the membrane electrolyte. The reactant gases are then fed through the porous conducting substrate material to reach the electrocatalyst surface. The geometric surface area of the face of each electrode comprising the electrode layer was 232 cm$^2$, and the single cell was representative of the cells used in currently available PEMFC stacks. The cell was operated under practical conditions employed for PEMFC stack operation. The reactant gases which were humidified to prevent the solid electrolyte membrane film from drying out during the performance measurements were fed to the cell as hydrogen at 30 psig pressure, and air also at 30 psig pressure. The temperature of the cell was maintained at 80° C. The current density taken from the cell was adjusted by applying a variable electrical load in controlled increments and the resulting cell voltage was measured when steady. The electrodes of the invention were evaluated as either cathodes with a standard anode or as anodes with a standard cathode, as described in the following Examples.

Although the Examples refer to the benefits of the electrode being demonstrated in a solid polymer fuel cell application, to those skilled in the art, it can be seen clearly that the electrodes of the invention would have benefit in all other fuel cell types (e.g. phosphoric acid, alkaline, direct methanol oxidation), and indeed other applications of gas diffusion electrodes, as detailed in the previous discussion.

A First Embodiment

In this example the non-uniform electrode layer takes the form of the electrocatalyst having a graded loading oriented such that the highest loading is at the region corresponding to the gas inlet and the lowest at the region corresponding to the gas outlet. The benefit of this non-uniform electrode layer is improved performance with the same total electrocatalyst loading. This example provides evidence which is contrary to the teaching of U.S. Pat. No. 4,851,377 (International Fuel Cells Corporation).

EXAMPLE 1

An oxygen reduction electrode (cathode) was formed by coating a porous electronically conducting carbon fibre paper substrate on one surface with a mixture comprising unsupported platinum black electrocatalyst and an aqueous suspension of polytetrafluoroethylene (PTFE), to form an electrode layer. The proportion of PTFE in the electrode layer was 6.6 wt %. The loading of platinum was varied across the surface of the electrode such that the area corresponding to the inlet one third of the gas flow path was coated to form a layer with a platinum loading of 4.0 mg/cm$^2$Pt. The area of the electrode corresponding to the centre one third of the gas flow path was coated to form a layer with a platinum loading of 2.0 mg/cm$^2$Pt and the area of the electrode corresponding to the outlet one third of the gas flow path was coated to form a layer with a platinum loading of 1.0 mg/cm$^2$Pt. The total average platinum loading across the whole active area of the cathode was thus 2.33 mg/cm$^2$. The electrode can be fabricated by any of the techniques commonly practised by those skilled in the art; for example, filter transfer, or rolling or spreading over the substrate surface. The electrode was dried and fired for 30 seconds at 400° C. to complete fabrication.

The MEA was formed by combining the cathode and a standard anode to each face of a proton conducting polymer membrane electrolyte, in a pressing operation at elevated temperature, as is common practise in the art to form an integral bonded unit. The standard anode was formed as described above but with a uniform platinum loading of 4.0 mg/cm$^2$Pt across the whole surface of the electrode. The proton conducting polymer membrane was an experimental membrane produced by the Dow Chemical Company, Freeport, Tex., U.S.A., and referred to as XUS-13204.10. The membrane was cleaned prior to forming the MEA.

Comparative Example 1

A conventional cathode was fabricated by coating a similar porous electronically conducting carbon fibre paper substrate on one surface with a mixture comprising unsupported platinum black and an aqueous suspension of polytetrafluoroethylene (PTFE) to form a uniform electrode layer. The total platinum loading across the active area of the cathode was 2.33 mg/cm$^2$ and the amount of PTFE in the electrode layer was 6.6 wt %. The loading of platinum was the same at each point across the surface of the electrode. The electrode could be fabricated by any of the techniques of filter transfer, or rolling or spreading over the substrate surface. The was dried and fired for 30 seconds at 400° C. to complete fabrication. An MEA was fabricated as described in Example 1.

Figure 1:
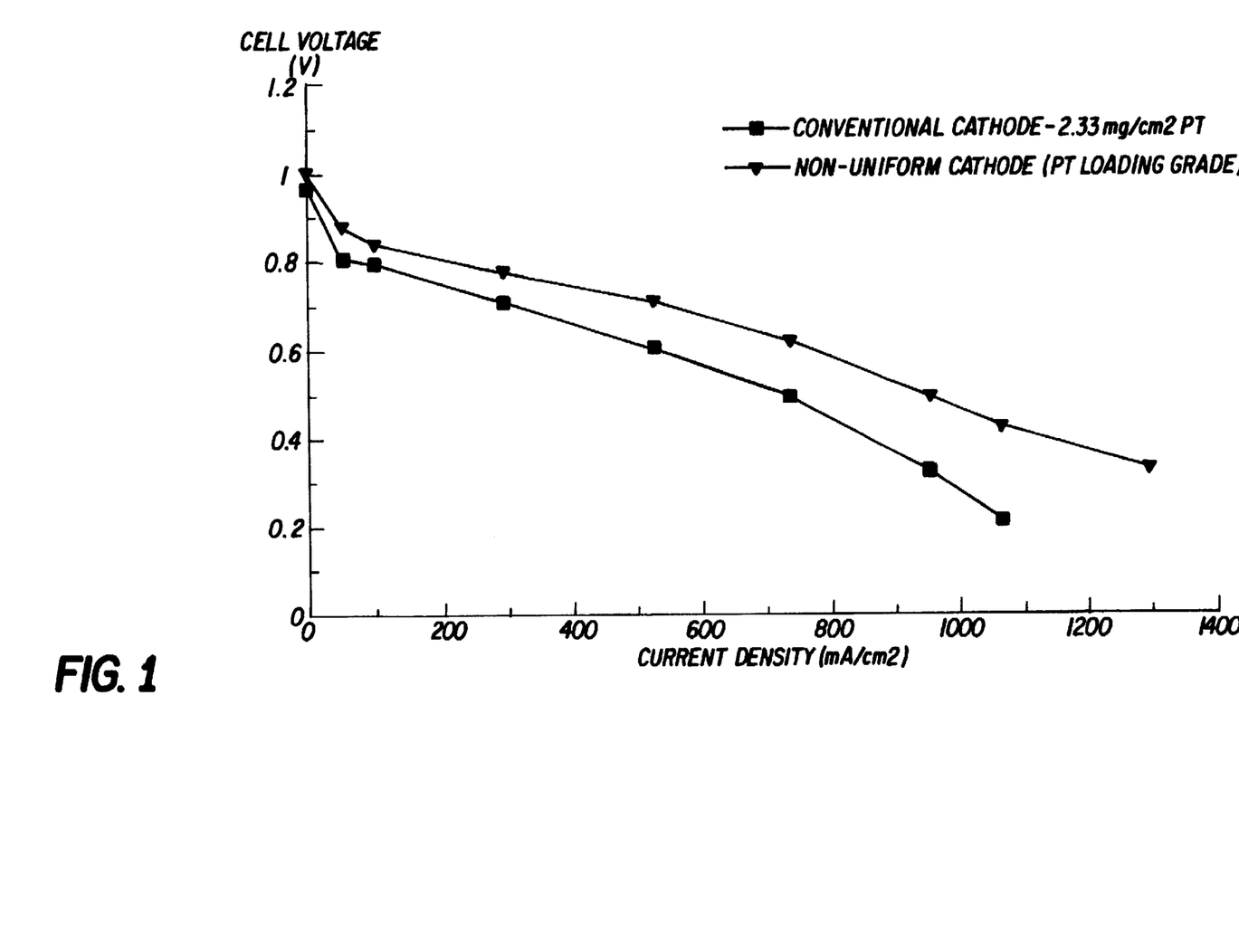
FIG 1: illustrates an improved electrode performance when using an electrode having a decreasing gradient of electrocatalyst from gas inlet to outlet.

As shown in FIG. 1 the performance of the MEA comprising the cathode with the non-uniform layer is considerably superior to that of the conventional cathode. At any given current density a higher cell voltage is obtained from the non-uniform cathode. The total loading of platinum electrocatalyst on both cathodes is the same, but by placing a higher amount of the active catalyst closer to the inlet gas flow, where the reactant concentration is highest, a greater amount of activity and performance is obtained.

A Second Embodiment

In this example the non-uniformity takes the form of the electrode layer containing the electrocatalyst being patterned to match the gas flow channels formed in the gas flow plate attached to the back of the electrode. The areas corresponding to the points at which the ribs of the gas flow plate contact the back of the electrode remain uncoated. The example is of an unsupported platinum black anode, and the benefit of this non-uniform layer is to maintain performance whilst reducing platinum electrocatalyst loading.

EXAMPLE 2

A hydrogen oxidation electrode (anode) was formed by coating a porous electronically conducting carbon fibre paper substrate on one surface with a mixture comprising unsupported platinum black electrocatalyst and an aqueous suspension of polytetrafluoroethylene (PTFE), to form an electrode layer. The proportion of PTFE in the electrode layer was 6.0 wt %. The electrode layer loading was varied across the surface of the electrode substrate to form a pattern of coated and uncoated regions. The pattern was designed to accurately match the pattern of the gas flow path across the back of the electrode, such that in the regions corresponding to the channels along which reactant gas flowed, a coating of the electrocatalyst containing mixture was applied, and in the regions corresponding to contact on the back of the electrode with the ribs of the gas flow plate, no coating of the electrocatalyst containing mixture was applied. The total average platinum loading across the whole geometric area of the anode was 1.31 mg/cm$^2$. The electrode was fabricated by mixing the electrode layer components with a solvent to form a paste with rheology characteristics which rendered the paste suitable for application to the substrate by use of a screen printing technique. The paste was printed through a screen which had been designed to allow printing only in the areas corresponding to the gas flow channels. The areas corresponding to the ribs of the gas flow plate were masked on the screen to prevent any of the paste printing onto the substrate. The electrode was dried and fired for 30 seconds at 400° C. to complete fabrication.

An MEA was formed with a standard cathode which comprised a uniform layer of 4.0 mg/cm$^2$ platinum loading and a Dow membrane as described in Example 1.

Comparative Example 2

A conventional anode was fabricated by coating a similar porous electronically conducting carbon fibre paper substrate on one surface with a mixture comprising unsupported platinum black and an aqueous suspension of polytetrafluoroethylene (PTFE) to form a uniform electrode layer. The total platinum loading across the active area of the anode was 4.0 mg/cm$^2$ and the proportion of PTFE in the electrode layer was 6.0 wt %. The loading of platinum was the same at each point across the surface of the electrode. The electrode could be fabricated by, for example, filter transfer, or rolling or spreading over the substrate surface. The electrode was dried and fired for 30 seconds at 400° C. to complete fabrication. An MEA was fabricated as described in Example 2.

Figure 2:
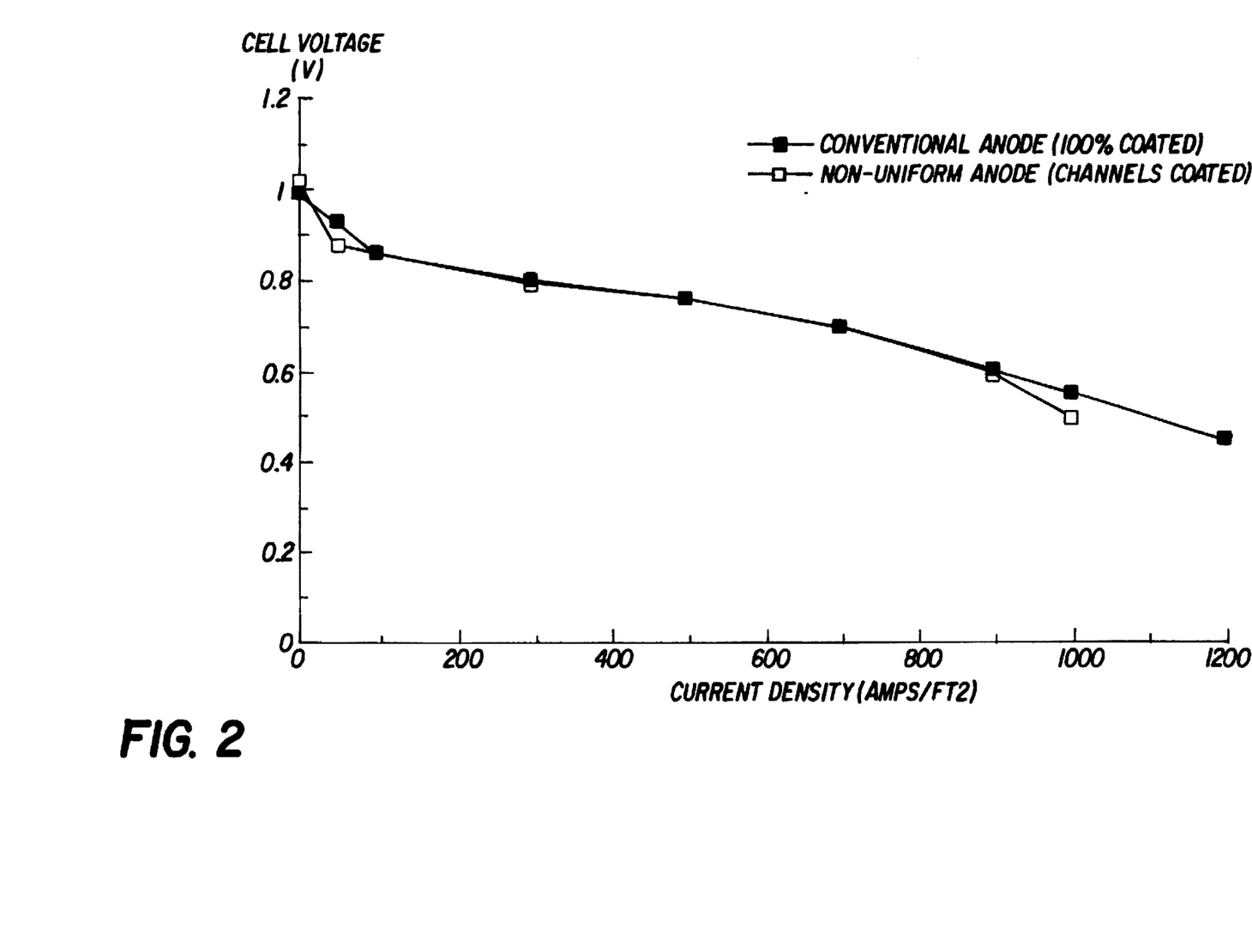
FIG. 2: illustrates the electrode performance when the electrocatalyst layer is coincident with the gas field flow.

As shown in FIG. 2 the performance of the MEA comprising the anode with the non-uniform layer is identical to that of the MEA fabricated with the conventional anode. Over the useful range of current density the same cell voltage is obtained from the MEA with the non-uniform anode. The total loading of platinum electrocatalyst on the anode of the Example is 1.31 mg/cm$^2$ compared with 4.0 mg/cm$^2$ on the Comparative Example, and thus by forming a non-uniform electrode in this manner, and placing the electrocatalyst containing electrode layer only in the regions in which it is effectively used, it is possible to reduce the quantities of the expensive electrocatalyst material required, whilst maintaining the same cell performance.

A Third Embodiment

In this example the non-uniform electrode layer takes the form of a gas-phase catalyst containing layer which is applied to the substrate only in the region corresponding to the gas inlet and not in the region corresponding to the gas outlet. In this particular example the electrocatalyst containing layer is itself a conventional uniform layer and is applied on top of the non-uniform gas-phase catalyst containing electrode layer. The benefit of this non-uniform electrode is improved performance as a hydrogen oxidation anode operating on hydrogen fuel which contains low levels of carbon monoxide impurities as usually found in a hydrogen fuel source derived from the reformation of fossil fuels such as methane or methanol.

EXAMPLE 3

A hydrogen oxidation anode was formed by coating a porous electronically conducting carbon fibre paper substrate on one surface with a mixture comprising carbon supported platinum gas phase catalyst and an aqueous suspension of polytetrafluoroethylene (PTFE), to form an electrode layer. The catalyst comprised 20 wt % Pt supported on Cabot Vulcan XC72R carbon, fabricated via the method disclosed in U.S. Pat. No. 5,068,161. The proportion of PTFE in the electrode layer was 30 wt %. The layer loading was varied across the surface of the electrode substrate such that only the region corresponding to the inlet one third of the gas flow path was coated with the electrode layer. The platinum loading in the coated region was 0.35 mg/cm$^2$. The total average platinum loading across the whole active area of the anode was thus 0.12 mg/cm$^2$. The electrode can be fabricated by, for example, filter transfer, or rolling or spreading over the substrate surface. The electrode was dried and fired for 15 minutes at 350° C. in nitrogen. A second electrocatalyst containing layer was then applied over the top of the gas phase catalyst layer. The electrocatalyst layer was a uniform layer coated evenly over the whole 232 cm$^2$ geometric active area of the electrode. A carbon supported Pt/Ru catalyst, comprising 20 wt % Pt/10 wt % Ru supported on Cabot Vulcan XC72R was mixed with a soluble form of Nafion solid polymer electrolyte membrane, produced by Solution Technology of Mendenhall, Pa., U.S.A., and referred to as a 5% solution of Nafion EW1100, to form a paste which was applied to the electrode by any of the techniques commonly practised by those skilled in the art; for example, screen printing, rolling or spreading. The loading of platinum in this layer was 0.25 mg/cm$^2$ across the whole of the electrode surface. The electrode was dried under vacuum at 70° C. to complete the fabrication.

An MEA was formed with a standard cathode which comprised a uniform layer of 4.0 mg/cm$^2$ unsupported platinum black loading and a Dow membrane as described in Example 1.

Comparative Example 3

A conventional low platinum loading uniform layer anode was fabricated by coating a similar porous electronically conducting carbon fibre paper substrate on one surface with a paste mixture comprising the carbon supported Pt/Ru catalyst as described in Example 3, and the soluble form of Nafion solid polymer electrolyte membrane. The paste was applied in a similar manner to that described in Example 3, to form a uniform layer with a platinum loading of 0.25 mg/cm$^2$ across the whole of the electrode surface. The electrode was dried under vacuum at 70° C. to complete the fabrication. An MEA was fabricated as described in Example 3.

Figure 3:
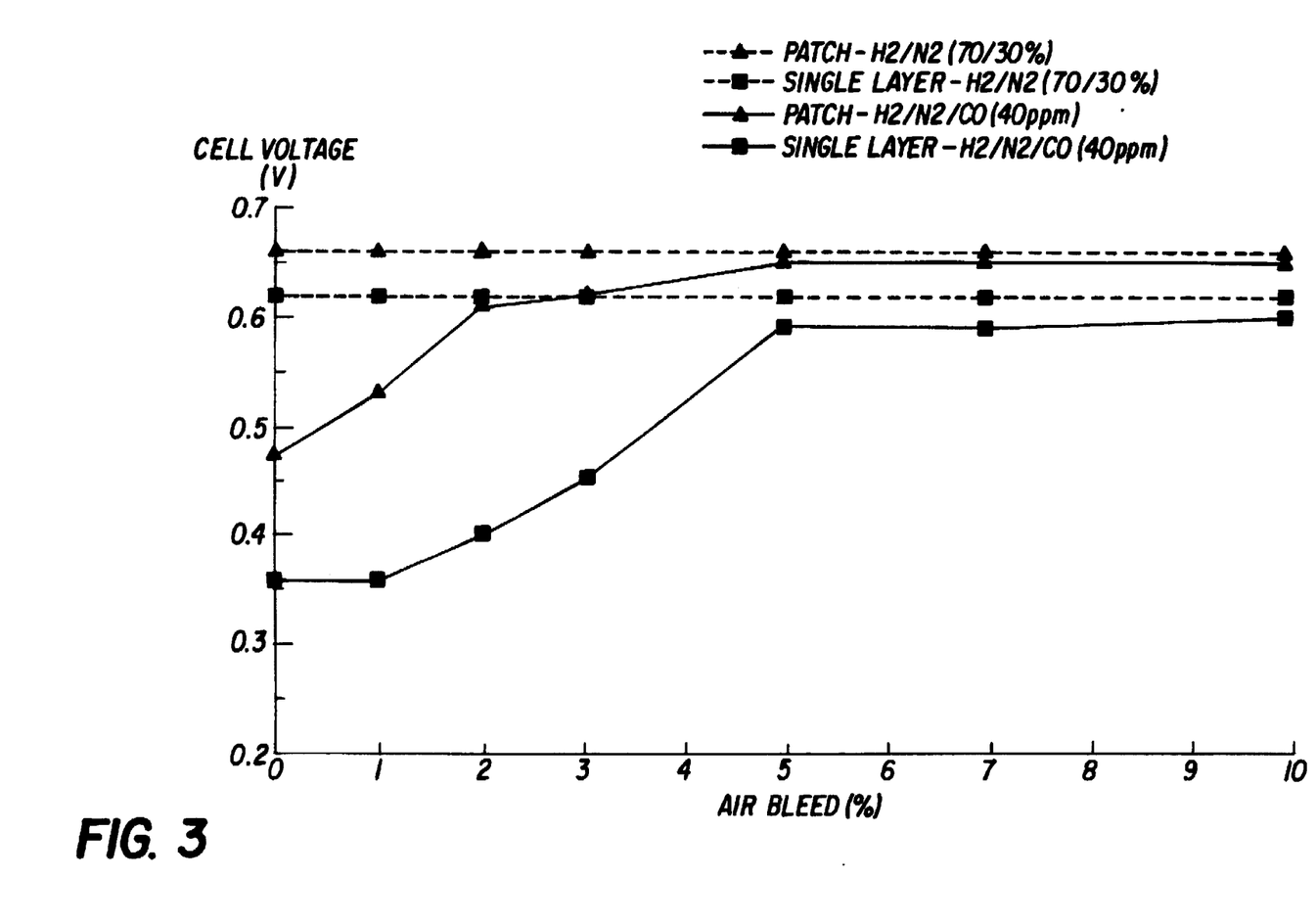
FIG. 3: illustrates the improved electrode performance when a gas-phase catalyst is present at the gas inlet.

The results are shown in FIG. 3. Example 3 of the invention is referred to in the FIGURE legend as the "patch" electrode, and the conventional Comparative Example 3 as the "single layer". The cell voltage performance at a current density of 700 A/ft$^2$ is measured as a function of air bleed concentration in the hydrogen fuel. This technique as described in U.S. Pat. No. 4,910,099 involves the introduction of a small quantity of air into the hydrogen fuel stream to cause oxidation of low levels of carbon monoxide impurities, which would otherwise cause a performance decrease due to electrocatalyst poisoning. FIG. 3 shows that at zero air bleed the performance of the Comparative Example 3, with a single uniform electrode layer, is reduced when the hydrogen fuel was replaced with a fuel containing 40 ppm carbon monoxide (CO). As an air bleed is introduced and the level increased, the performance increases and eventually reaches that of the hydrogen fuel with no carbon monoxide poison. With the non-uniform electrode of Example 3, some performance reduction is again observed at zero air bleed, but due to the presence of the gas phase catalyst layer, the performance increases much more rapidly as the air bleed is introduced. This is due to the presence of the gas-phase catalyst containing layer promoting the more efficient oxidation of the carbon monoxide poison before it reaches the electrocatalyst containing layer.

We claim:

1. A gas-liquid permeable porous electrode, comprising one or more electrode layers supported on one side of a substrate, wherein at least one of the one or more electrode layers is free from electrocatalyst, wherein the one or more electrode layers free from electrocatalyst comprises at least one component, wherein the at least one component is present in a first amount per unit area at a first region adapted to be adjacent a bulk gas inlet, and the at least one component is present in a second amount per unit area at a second region at a point on the substrate remote from the first region.

2. An electrode according to claim 1, wherein the amount of the at least one component gradually increases from the first amount to the second amount.

3. An electrode according to claim 1, wherein the amount of the at least one component gradually decreases from the first amount to the second amount.

4. An electrode according to claim 1, wherein the amount of the at least one component fluctuates between the first amount and the second amount.

5. An electrode according to claim 1, wherein the at least one component is selected from one or more of a polymeric material, a gas phase active catalyst, carbon particles/fibres or a contact resistance adhesive.

6. An electrode according to claim 2, wherein the at least one component is selected from one or more of a polymeric material, a gas phase active catalyst, carbon particles/fibres or a contact resistance adhesive.

7. An electrode according to claim 5, wherein the polymeric material is selected from polytetrafluoroethylene, polyethylene, polyvinylchloride or a form of a proton-conducting polymer membrane electrolyte which is soluble in a solvent and combinations thereof.

8. An electrode according to claim 6, wherein the polymeric material is selected from polytetrafluoroethylene, polyethylene, polyvinylchloride or a form of a proton-conducting polymer membrane electrolyte which is soluble in a solvent and combinations thereof.

9. An electrode according to claim 5, wherein the at least one component is a gas phase active catalyst.

10. An electrode according to claim 1, wherein the non-uniform layer is in the form of a pattern.

11. An electrode according to claim 10, wherein the non-uniform layer is patterned to coincide with a pathway of a gas flow field.

12. An electrode according to claim 1, wherein said electrode forms either an anode or a cathode in a fuel cell.

13. An electrode according to claim 1, wherein the difference in the amount of the component being within a plane of a surface of the electrode.

14. An electrode according to claim 1, further comprising a uniform electrocatalyst layer.

15. A membrane electrode assembly, wherein at least one of the electrodes is an electrode according to claim 1.

16. A fuel cell comprising an electrode according to claim 1.

17. A process for the production of an electrode comprising the steps of:

(i) preparation of at least one component and solvent into a paste; and (ii) transferring the paste onto one or more sides of a substrate to form one or more electrode layers, wherein at least one of the one or more electrode layers is free from electrocatalyst, wherein the one or more electrode layers free from electocatalyst comprises the at least one component, and wherein the at least one component is present in a first amount per unit area at a first region adapted to be adjacent a bulk gas inlet, and the at least one component is present in a second amount per unit area at a second region at a point on the substrate remote from the first region.

18. A process according to claim 17, wherein the at least one of the one or more electrode layers is applied in the form of a pattern.

19. A process according to claim 17, wherein the at least one of the one or more electrode layers is applied by using a screen printing technique.

20. A process according to claim 17, wherein the difference in the aamount of the at least one component being within a plane of a surface of the electrode.

21. A gas-liquid permeable porous electrode, comprising one or more non-uniform electrode layers supported on one side of a substrate, wherein at least one of the one or more non-uniform electrode layers comprises at least one component, wherein the at least one component is not an electrocatalyst, and wherein the at least one component is present in a first amount per unit area at a first region adapted to be adjacent a bulk gas inlet, and the at least one component is present in a second amount per unit area at a second region at a point on the substrate remote from the first region.

* * * * *